A. BRADLEY & F. A. ELLIOTT.
HEN'S NEST.
APPLICATION FILED JUNE 20, 1906.
1,160,250.
Patented Nov. 16, 1915.
2 SHEETS—SHEET 1.
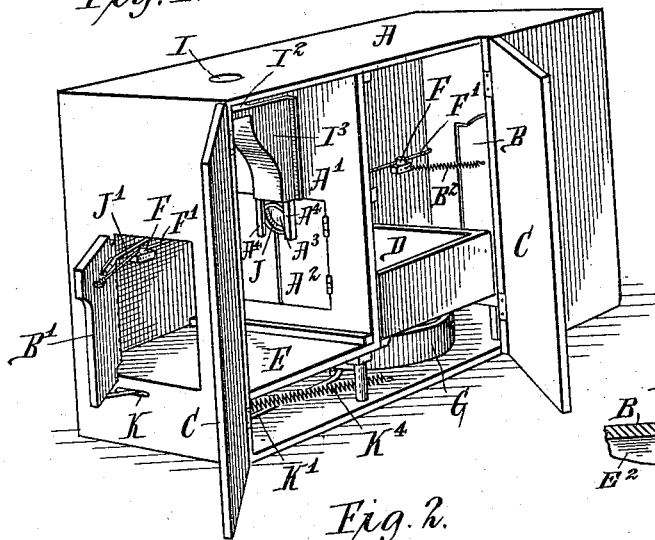
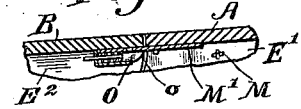
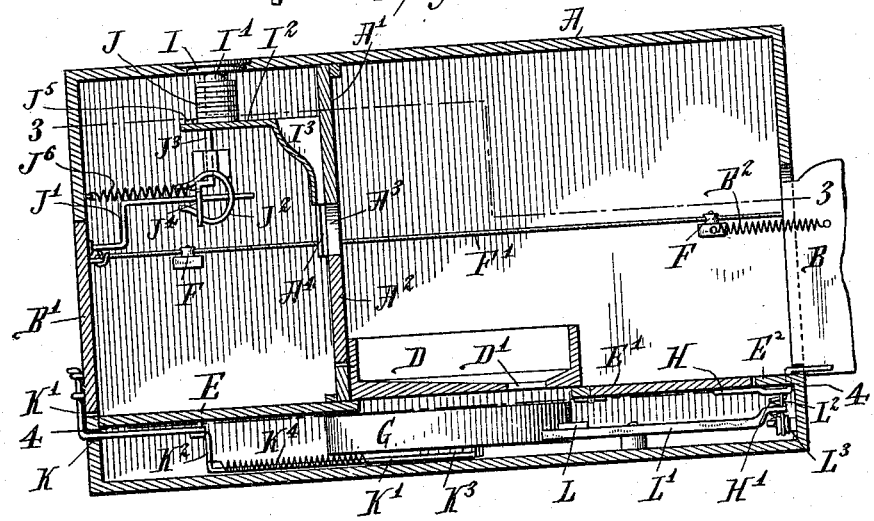
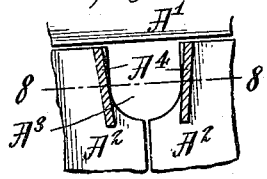
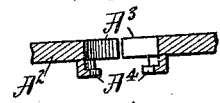
Alexander Bradley,
Frederick A. Elliott,  } Inventors.
Witnesses:
Christ Feinle, Jr.,
Matilda C. Sticht.
By Emil Neuhart
Attorney.
COLUMBIA PLANOGRAPH CO., WASHINGTON, D. C.

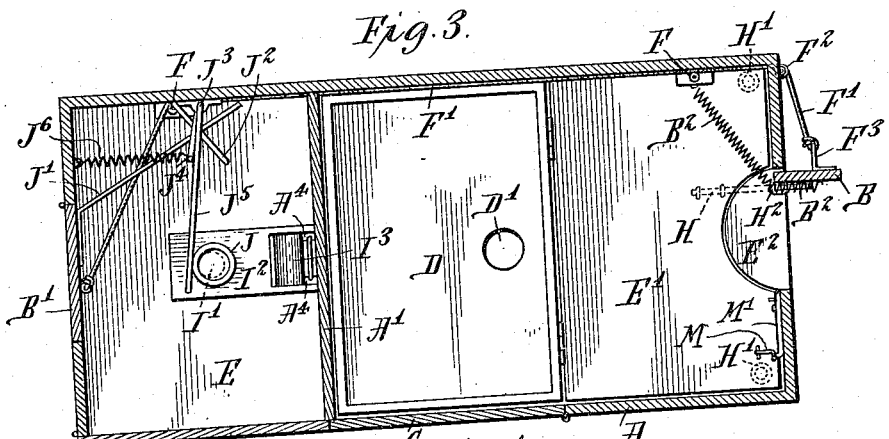
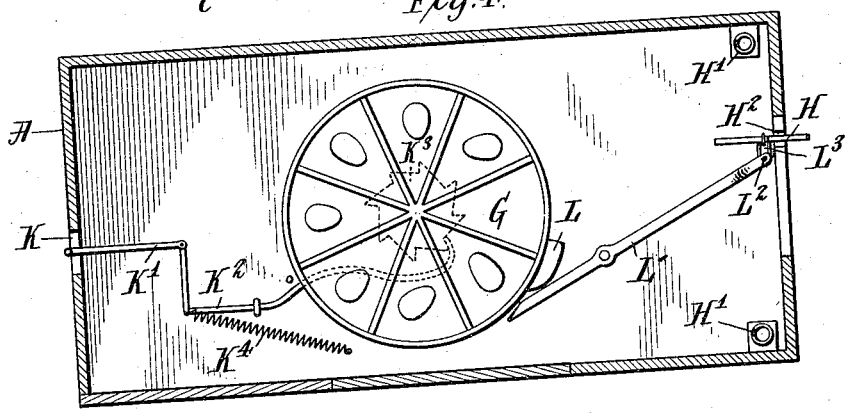
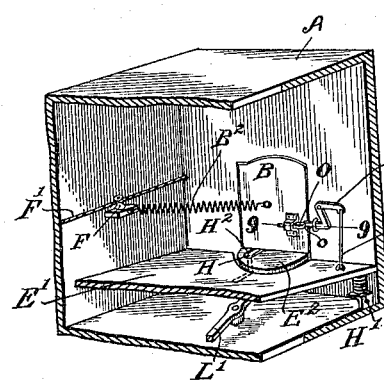
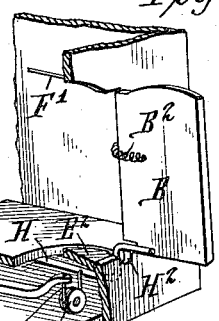

UNITED STATES PATENT OFFICE.

ALEXANDER BRADLEY AND FREDERICK A. ELLIOTT, OF MERRITTON, ONTARIO, CANADA, ASSIGNORS TO THE PARADISE BROODER COMPANY, A CORPORATION OF NEW YORK.

HEN'S NEST.

1,160,250.

Specification of Letters Patent. Patented Nov. 16, 1915.

Application filed June 20, 1906. Serial No. 322,573.

*To all whom it may concern:*

Be it known that we, ALEXANDER BRADLEY and FREDERICK A. ELLIOTT, both subjects of the King of Great Britain, residing at Merritton, in the Province of Ontario, Dominion of Canada, have invented new and useful Improvements in Hens' Nests, of which the following is a specification.

Our invention relates to an improvement in trap nests and the object of our invention is a device by which a number of hens may be successively trapped and each hen marked as she leaves the nest.

A further object is to provide a trap nest having a plurality of egg compartments, a nest having an opening on the bottom thereof, and means for successively bringing the egg compartments into alinement with the nest opening as a hen leaves the nest.

A further object of the invention is to provide a trap nest of the kind above described which will be automatically closed and the door locked when all of the egg compartments have been filled.

The invention consists of the novel features of construction, hereinafter fully described, pointed out in the claims and shown in the accompanying drawings, in which,—

Figure 1 is a perspective view of the nest, doors being shown in open position to more clearly show the interior of the nest. Fig. 2 is a longitudinal vertical section taken centrally through the nest. Fig. 3 is a horizontal section upon the line 3—3, of Fig. 2. Fig. 4 is a horizontal section upon the line 4—4, of Fig. 2. Figs. 5 and 6 are detail outline perspective views, illustrating door closing means, certain parts being omitted therefrom. Fig. 7 is a detail view, showing a portion of inner doors, and showing in section guide-ways to receive a marking ring. Fig. 8 is a section on line 8—8, of Fig. 7. Fig. 9 is an enlarged horizontal section taken on line 9—9, Fig. 5.

In these drawings, A represents a box, which forms the casing for the trap nest and which is divided by a partition A' into two compartments. Double doors $A^2$ are hinged in the partition A' and open inwardly into the rear of the two compartments. A hinged door B is provided at the front end of the box A and opens outwardly and a door B', slightly cut away upon its free edge, is hinged in the rear wall of the casing and also opens outwardly.

The doors B and B' provide, respectively, ingress and exit for the hens. The doors $A^2$ permit the hens to pass from the front compartment, into which they come through the door B, into the rear compartment from which they make their exit through the door B', the cut-away portion of the door B' affording a space of light, which attracts the hen and also permits her to extend the head and neck through the space formed by cutting away a part of the door, thus permitting her to push the door open in endeavoring to pass out through the space provided.

To permit removal of the receiving egg tray, doors C are provided in one side of the box A. A nest D is placed in the front compartment and is provided with an opening D' in the bottom, and the bottom of the nest slopes gradually to the said opening. A false bottom E is provided adjacent the rear end of the box A and a false bottom E' is provided at the front end, and the nest D rests upon the opposing edges of these false bottoms and bridges the space between them.

The door B is normally held closed by a spring $B^2$, but in order to open the said door so as to give access to the nest D when unoccupied, small rollers F are placed upon one side of the casing A within the same and a cable or wire F' is secured at one end to the door B' and passes over the rollers F, and through the front wall of the casing and is connected at its opposite end to the angled bracket $F^3$ secured upon the door B, the cable F' working also over a roller $F^2$ upon the front of the casing. By means of this construction, the door B is drawn into an open position whenever the door B' is swung open, so that the opening of the rear door to permit one hen to pass out would automatically open the front door to give access to the nest to a second hen.

In the space below the nest D, is detachably mounted a rotatable egg tray G, which is divided into any desired number of compartments, each of which is designed to hold one egg. To lock the door B in open position after it has been opened, by the opening of the door B', we hinge a portion of the false bottom E', adjacent the nest D, and this hinged portion is cut out along its front edge and a non-hinged stationary segment $E^2$ fills the said space and forms a fixed threshold at the entrance to the casing A. The front edge of the hinged portion of the bottom E' carries a forwardly extending angled stop-arm H, and the bottom E' is normally held in a horizontal position by means of coil springs H' arranged between it and the true bottom of the casing. The door sill of the door B is notched as shown at H² and the forwardly projecting end of the arm H normally rests immediately above said notch when the door B is in open position, thereby preventing the closing of the said door. As the hen enters the nest, however, and steps upon the hinged portion of the bottom E', the weight of the hen will depress the said bottom and the arm H will drop into the notch H² and the spring B² will close the door B and hold it closed until it has again been opened by the opening of the door B', which will again permit the arm H to rise from the notch H² and lock the door B against closing until the hinged portion of the bottom E' is again depressed. It is to be understood, therefore, that when the door B is closed, the arm H is in depressed position and the hinged portion of the bottom is also depressed owing to said arm being secured thereto.

In order to mark the hens which have entered the casing A, the top of the casing is cut out and the said cut out portion is closed by a plug I which carries a depending stem I'. A shelf I² is supported from the partition A' and is immediately below the lower end of the depending stem I', but spaced a sufficient distance therefrom.

A downwardly extending vertically arranged chute I³ is carried by the partition A', and the front edge of the shelf I² forms one upper edge of the chute I³. The double doors A² are cut out adjacent their upper ends as shown at A³ and converging ribs or guides A⁴ are carried by the said doors adjacent the cut out portion A³ and in alinement with the lower end of the chute I³. Rings J are placed upon the shelf I², being dropped into position through the opening closed by the plug I and are held against longitudinal movement by the stem I' which descends within the rings with the exception of the lowermost or bottom ring which can travel along the shelf I² as it lies below the lower end of the stem I. To move the rings J along the shelf of the chute I³, an angled bar J' somewhat flexible is secured to the door B', and the movement of the said arm is limited by a horseshoe shaped guide J², the ends of which are secured in the side of the casing A and which straddles the bar J'. By making the bar J' flexible, the door B' can be opened by the hen to the necessary extent as it passes out, since the bar, after striking the end of said guide will yield under the pressure exerted by the hen.

An angled bar J³ is journaled vertically upon the side of the casing and carries at its upper end a wiper arm J⁵ which is adapted to slide upon the shelf I² while the lower portion J⁴ of the bar J³ is adapted to be struck by the angled bar J', thus rotating the bar J³ in its bearings and moving the wiper arm J⁵ along the shelf I² in the direction of the chute I³. It is to be noted that the degree of flexibility of the angled bar J' is such that it will not flex when striking the lower portion J⁴ of the bar J³; it being sufficiently stiff to swing the latter in its bearing. While this arrangement will serve the purpose intended, other means may be substituted therefor. This movement of the wiper arm will move the lowermost ring J along the shelf and it will fall down the chute and be caught and held between the guide-ribs A⁴ and when the hen leaves the nest she will first project her head and neck through the opening A³ and then press upon the doors A² and will carry with her the ring J held between said guide-ribs which will encircle her neck.

For the purpose of turning the wiper arm to normal position after having delivered a ring into the chute I³, a retractile spring J⁶ is provided which has one end secured to the casing and its other end to the lower portion J⁴ of the bar J³ of which the wiper arm forms a part. This spring yields to the action of the angled bar J' without causing the latter to flex.

In order to rotate the egg tray G and bring the various compartments in alinement with the openings D', a link K' has an upwardly extending outer end portion secured to the door B' and a horizontal inwardly extending portion which works through a suitable slot K formed in the rear of the casing and this link is pivotally connected to the pawl K² which engages the ratchet K³ carried by the underside of the tray G and each time the door B' is opened the pawl will engage the ratchet teeth and rotate the tray G a sufficient distance to bring a new compartment in alinement with the opening D'. The door B' and the link K' and pawl K² are all restored to their original position by means of a spring K⁴ which is connected at one end to the bottom of the casing and at the opposite end to an upwardly extending rear end portion of the pawl, which portion is pivoted to the link K'.

In order to entirely close the nest and prevent it being again used until reset after all of the compartments have been filled in the tray G, a cam L is secured to the side of the tray, which is cylindrical in form and this cam engages and operates an end of a pivoted lever L'. A rod M is pivotally connected to a substantially Z-shaped pivoted catch M', and the lower end of this rod is secured to the hinged portion of the false bottom E. A cord L² is connected to the front of the lever L' and passes downwardly and thence upwardly over a roller L³ fastened to the casing and is connected to the angled arm H. As the lever L' is swung by the cam L upon bringing into alinement the last compartment of the tray G with the opening D', the cord L² pulls downwardly the arm H into the notch H² and the door B is swung to by the spring B². It is to be noted that during this action the bottom to which the bar H is secured, is depressed to a greater extent than possible by the weight of any hen that may enter the nest and consequently the rod M causes the substantially Z-shaped pivoted catch to cause its free terminal to project beyond the edge of the entrance door opening. The door swings into closed position against the projecting terminal of said catch and is engaged by a spring-actuated slide bolt O secured to the door and spaced therefrom so that as the beveled end o of said slide bolt engages said terminal it is caused to recede against the action of its spring so as to pass said terminal, but recovers itself after passing the terminal of said catch and latches behind the same. In this manner the entrance door becomes automatically locked and the hens cannot again enter the casing until after the tray has been emptied and reset, which is most conveniently done by opening the side doors. After resetting the tray C the catch M' is swung on its pivot so that its free terminal will not project beyond the edge of the entrance door opening. This permits the nest to be again used by the hens. It is of course understood that the cam L and parts associated therewith for latching the door after the egg tray is filled, will be so constructed and arranged that assurance is had of the door B closing before the catch M' is operated.

Having thus described our invention, what we claim is,—

1. A trap nest having an entrance door, an exit door, a rotatable egg tray divided into compartments, means operable by opening of the exit door for rotating the tray step by step, and means for applying a marker to a hen at a point between the two doors.

2. In a trap nest, a casing divided into two compartments, swinging doors between the compartments, doors opening outwardly at the ends of the casing, means for automatically opening the front door when the rear door is opened, marker holding means carried by the doors between the compartments, and means operable by the opening of the rear door for feeding markers successively to the said holding-means.

3. A trap nest comprising a casing divided into front and rear compartments, swinging doors between the compartments, the upper portion of said doors being cut away, converging guides arranged upon the doors adjacent the cut away portions, doors opening outwardly at each end of the casing, a depressible false bottom in the front compartment, a nest in the front compartment adjacent said bottom, means connecting the doors adapted to open the front door when the rear door is opened, means operable by the rear door for feeding markers to the converging guides, means carried by the depressible bottom for locking the front door in open position after it has been opened by the means connected to the rear door, the said locking means being disengaged from the door when the bottom is depressed and a spring adapted to close the front door upon depression of the false bottom.

4. In a trap nest, a nest having an opening in the bottom, the bottom of the nest sloping toward said opening, a rotatable egg holding tray arranged below said nest and divided into compartments, a ratchet carried by the tray, a pawl adapted to engage the ratchet and rotate the nest step by step, a door admitting the hen to the nest, an exit door, means connecting the doors adapted to open the first-mentioned door when the exit door is opened, means for automatically locking the first mentioned door in open position and for releasing said locking mechanism as a hen passes to the nest, and means carried by the exit door adapted to operate the pawl.

5. In a trap nest of the kind described, a casing divided into compartments, swinging doors between the compartments having cut out portions, marker holding means carried by the said doors adjacent the said cut out portions, a shelf adapted to support marker rings, a chute leading from said shelf to the marker holding means upon the doors, an exit door, and means operable by the opening of said door for moving one marker ring along the shelf into the chute, as and for the purpose set forth.

6. The combination of a casing having an entrance and an exit, doors to close said entrance and said exit, an egg nest within the casing, a series of identifying devices, and means actuated by the exit door to cause said identifying devices to be removed successively from their normal position to a position in which they can be carried away by the hens by their natural movement in passing through the casing.

7. The combination of a casing having an entrance and an exit, a wall between said entrance and exit having flaps with openings therein, and means actuated by the hens in passing through the casing for supplying rings to said openings, said rings to be taken away by the hens in passing through the casing.

8. The combination of a casing having an entrance and an exit, doors for said entrance and said exit, an egg nest within the casing, a series of releasable identifying devices positioned in the path of the hens between the egg nest and the exit door, and means actuated by said exit door to successively feed said identifying devices in the path of the hens to be carried away by them in passing through the casing.

9. The combination of a casing having an entrance and an exit, an egg nest within the casing, and a series of identifying devices adapted to be brought successively into a position to be carried away by the hens passing through the casing, and means for successively feeding said identifying devices into said position actuated by the hens in passing through said casing.

10. A trap nest having an entrance door, an exit door, an egg nest between said doors, operative connection between said exit door and said entrance door to cause the entrance door to be opened when opening said exit door, and means for applying a marker to a hen at a point between the two doors.

ALEXANDER BRADLEY.
FREDERICK A. ELLIOTT.

Witnesses:
H. L. A. ALMON,
E. H. PHELPS.

Copies of this patent may be obtained for five cents each, by addressing the "Commissioner of Patents, Washington, D. C."